HENRY H. MACKAL
ARMEN BOGOSSIAN
INVENTORS.

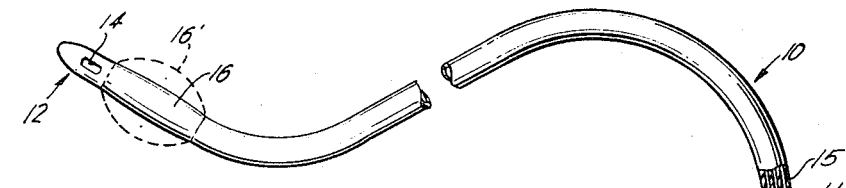
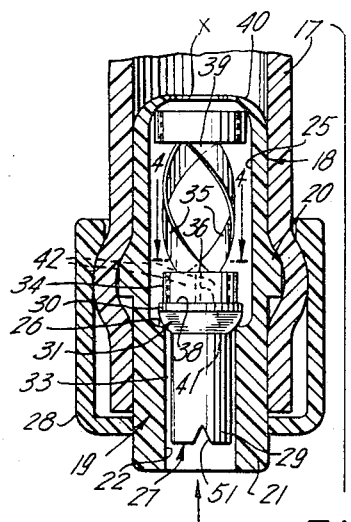
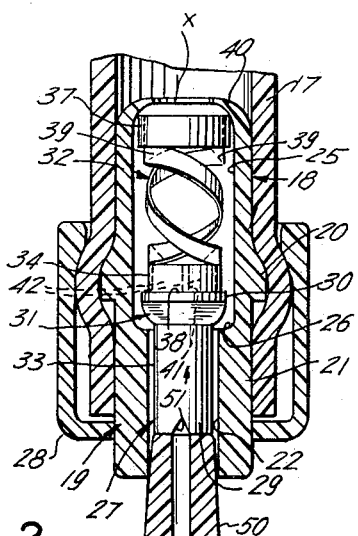
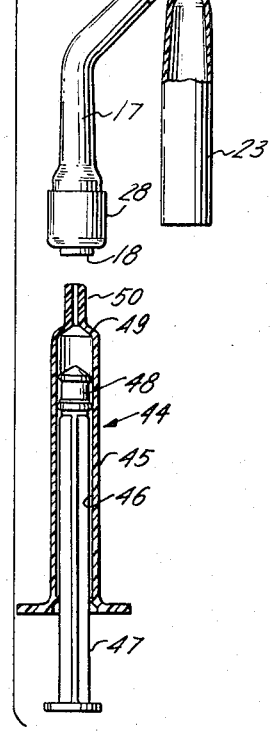
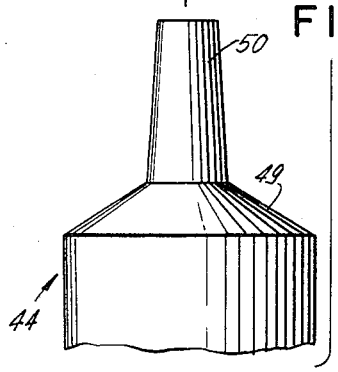
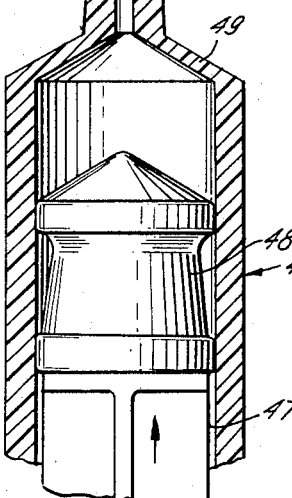
HENRY H. MACKAL
ARMEN BOGOSSIAN
INVENTORS.

BY Alfred W. Nibbe

ATTORNEY

United States Patent Office 3,429,338
Patented Feb. 25, 1969

3,429,338
INFLATION VALVE HAVING HELICALLY WOUND LEAF SPRING MEMBERS FOR PRODUCING ROTATION OF THE VALVE
Henry H. Mackal, 1924 Sunrise Key Blvd., Fort Lauderdale, Fla. 33304, and Armen Bogossian, 584 Cumberland Ave., Teaneck, N.J. 07666
Filed Dec. 30, 1965, Ser. No. 517,685
U.S. Cl. 137—543.23          8 Claims
Int. Cl. F16l 37/28; F16k 15/18

ABSTRACT OF THE DISCLOSURE

A simplified check valve adapted for use as an inflation valve, such valve securely sealing the passage therethrough under conditions of moderate pressure. The valve has a body having a passage therethrough, there being a transverse annular, first valve seat in the body surrounding the passage. A relatively soft, resilient valve element having a second valve seat thereon cooperates with the first valve seat. The valve element is constantly urged toward its valve-closed position by a spring means having annular members at its opposite end connected by helical spring-forming struts. One end member of the spring means frictionally engages the valve element, whereby the valve element turns with such end member as the spring means is axially compressed and allowed to expand.

---

This inventon relates to a valve, and more particularly relates to an inflation valve of the check type adapted selectively to pass or to check the passage of a fluid therethrough. In the illustrative embodiment described herein the valve controls the flow of fluid from an inflatable balloon-like catheter-retaining portion of a catheter; it is to be understood that the valve of the invention is capable of use to advantage in a variety of other applications, as will be more particularly pointed out hereinafter.

This invention is an improvement upon that disclosed and claimed in the patent to De See, No. 3,192,949, July 6, 1965, assigned to the present assignee.

The invention has among its objects the provision of an improved, simplified valve.

A further object of the invention lies in the provision of a valve of the type described which has an improved, more positive sealing action under conditions of moderate pressure applied to thrust the sealing portions of the valve together.

Another object of the invention is the provision of a check valve which is easily manipulated, both to inflate and to deflate an inflatable article with which the valve is associated.

Yet another object of the invention is the provision of a valve of the type described, the parts of which are economically made and easily assembled.

A still further object of the invention is the provision of a valve of the type indicated which has a large flow rate in any of the positions in which it is substantially opened and which can not be closed to the passage of fluid therethrough despite movement of the movable valve element of the valve beyond its normal fully opened position.

Still another object of the invention is the provision of a valve wherein the opening and closing of the valve causes the movable valve element to rotate with respect to the valve seat in the valve body, thereby insuring tight sealing engagement between the fixed and movable valve seats of the valve upon the closing of the valve.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in elevation of a catheter with which a preferred illustrative embodiment of valve made in accordance with the present invention is shown employed, an intermediate portion of the catheter being broken away for economy of space in the illustration of the catheter, an inflation syringe being shown about to be applied to the valve;

FIG. 2 is a fragmentary view in axial section through the valve employed in the catheter of FIG. 1 and of the end of the tube within which such valve is telescoped, certain of the parts being shown in elevation, the forward or nozzle end of the inflating syringe being shown about to be applied to the valve;

FIG. 3 is a fragmentary view in axial section through the valve, the tube in which it is mounted, and the forward, nozzle end of the syringe, such end of the syringe being shown inserted into the outer end of the valve to open the same, the syringe being shown in the act of injecting water through the valve into the catheter-retaining portion of the catheter;

FIG. 4 is a fragmentary view in transverse section through a portion of the spring element of the valve, the section being taken along the line 4—4 of FIG. 2;

Figure 5:
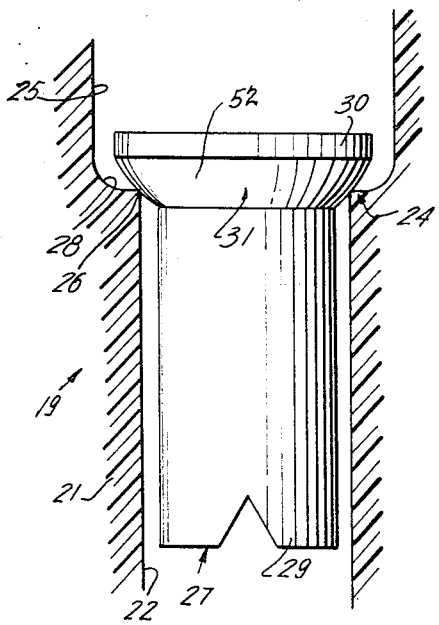
FIG. 5 is a fragmentary view on an enlarged scale in vertical axial section through the body and movable valve element of the valve shown in FIGS. 2 and 3, showing the configuration of the cooperating valve seats on such parts.

The catheter with which the illustrative embodiments of the valve of the invention is illustrated may be one made, for example, in accordance with U.S. Patent No. 2,320,157 to Raiche. One such catheter is shown in FIG. 1, where it is generally designated by the reference character 10; it has an elongated inner rubber void tunnel or tube 11 which has a rounded tip at the end of its inner free end portion 12, which is adapted to be introduced into the bladder of a patient through the urethra. The drainage openings 14 through the wall of end portion 12 are shown; urine passes into openings 14, along tube 11, and to further tubing (not shown) attached to the enlarged outer end portion 23 of tube 11.

The catheter shown is of the type which remains in place in the bladder of the patient for an appreciable period of time. To secure the catheter in place, there is provided an outer rubber tube 15 telescoped over the inner tube 11, tube 15 terminating in a thin weakened portion 16, the inner end of which is sealed to the outer surface of tube 11 adjacent tip 12 of the catheter. The outer end of tube 15 is sealed to the outer surface of inner tube 11 adjacent portion 23 of the latter. A branch tube 17 is connected to the catheter so that the passage in tube 17 communicates with the space between tubes 11 and 15 and thus with the space within zone 16 of the outer tube. A check valve 18, made in accordance with the invention, is sealingly connected to tube 17 by being telescoped within the outer end of such tube. Preferably a ferrule 28 is employed, as shown, such ferrule compressively engaging the portion of tube 17 within which valve 18 is mounted. Ferrule 28 also functions to assist the prevention of the undue expansion of valve body 21 upon the insertion of a syringe nozzle thereinto in the manner shown in FIG. 3.

In use, the tip 12 of the catheter is inserted into the urethra, the catheter then being progressively inserted inwardly until the tip 12 and zone 16 thereof lie within the bladder. Fluid, such as water, is then injected through valve 18 into tube 17 and then between tubes 11 and 15, a pre-measured quantity of water being thus injected to inflate the portion 16 of the catheter into a balloon-like enlargement 16' which prevents withdrawal of the catheter from the bladder. The valve 18 functions as a check valve preventing the discharge of water from enlargement 16', and, therefore, preventing the release of the catheter, until such action is desired.

The construction of valve 18 and the manner in which it operates are illustrated in FIGS. 2, 3, 4, and 5. As there shown, the valve has a generally circular cylindrical hollow body 19; body 19 is relatively hard and unyielding, being made, for example, of a tough plastic material.

The body 19 of the valve 18 is generally circular cylindrical in external configuration, but has an annular rib 20 on its outer surface intermediate the length of the body. Rib 20 has a transverse forward surface and a rearwardly converging frusto-conical rear surface so that the valve body may be readily telescoped within the tube 17 but can not be easily removed therefrom. After thus being telescoped within the tube, the valve is retained therein by the above-mentioned outer sleeve member 28, which may be made of hard rigid material, which is telescoped over the outer end of the tube, as shown.

The outer, forward portion 21 of the valve body 19 is of relatively thick section, and has an axially extending, smaller diametered circular cylindrical passage portion 22 therethrough. At the inner end of the passage portion 22, the body 19 is provided with a transverse annular shoulder 26 presenting an annular inner edge forming a seat 24. Inwardly of shoulder 26 there is a large diametered passage portion 25 in the valve body coaxial of passage portion 22, portion 25 merging with the outer edge of shoulder 26. Reciprocably mounted within the passage 22, 25 in the valve body 19 is an inner valve element which is generally designated 27. Element 27 has a circular cylindrical outer end portion or stem 29 which is of somewhat smaller diameter than the passage 22. There is thus presented an annular passage 33 between the stem 29 and passage portion 22. At the rear end of portion 29, the valve element 27 has an enlarged head 30, the forward end of which is in the form of a forwardly converging part-spherical surface forming a seat 31. The configurations of seats 24 and 31, which are shown most clearly in FIG. 5, will be more fully discussed below. The outer smaller diametered end of seat 31 is located adjacent the inner end of the stem portion 29 of the valve element. Valve element 27 is preferably made of resiliently yieldable rubber or rubber-like material such as neoprene having a midrange durometer rating. It will be seen that when the valve element 27 is thrust into its forward closed position as shown in FIG. 2, the passage 22, 25 through the valve body is closed by reason of sealing engagement of the seat 31 on the valve element 27 with the seat 24 on the valve body. When, however, the valve element is thrust rearwardly, as shown in FIG. 3, the passage through the valve body is opened, fluid thus being able to pass through the valve in either direction through the annular space 33 provided between the forward stem portion 29 of the element 27 and the passage 22, between the valve seats 24 and 31, through the passage 25, and thence through the central hole X through the crimp at the inner end of the valve body 21.

The valve of the present invention incorporates a novel resilient means functioning as a spring which constantly urges the valve element 27 toward its forward closed position. Such spring element, which is generally designated 32, is interposed between the inner end surface 38 of the head 30 of the valve element and an abutment means 40 at the rear end of the valve body, the spring means being held in compression in all positions of the valve element. The spring element 32 has a forward annular element 34 which is positioned generally coaxially of the valve element 27 with the forward edge of member 34 resting upon the end surface 38 of the head 30 of the valve element. Connected to the rear edge of the annular member 34 at positions spaced diametrically of the annular member are two helical leaf spring members 35 which are of the same section and of the same hand and pitch.

In the illustrative embodiment, each of the spring members 35 extends through an angle about its axis of substantially 270°, and the helical angle of such spring members is about 50°. The members 35 have widths which greatly exceed their radial thickness. As a result of such construction, the spring members strongly resist axial compression, but yield when the applied compressive force exceeds a predetermined minimum. Upon the compression of the spring member 32, the resulting axial distortion of the spring members is accommodated in part by rotation of the opposite ends of the spring members relative to each other in such direction as further to wind them up, with a resultant decrease in their helix angle. Upon release of the compressive force upon member 32, the spring members 35 are restored to their original condition.

The rear ends of spring members 35 are secured at diametrically opposed positions to the forward edge of an annular member 37 which is of somewhat smaller diameter than the passage 25 in the valve body and is somewhat loosely positioned coaxially of such passage in the rear end thereof. The annular member 37 and thus the spring member as a whole are retained within the passage 25 by the aforesaid abutment 40 which, in the embodiment shown, is formed by crimping or curling and rolling in the outer edge of the valve body so that it overlies the member 37.

In the embodiment shown, the spring member 32, including the parts 34, 35, and 37 thereof, is made as an integral molded plastic element. The spring element 32 may be made, for example, of tough, resilient plastic having excellent "memory" qualities.

The valve 18 shown is adapted to cooperate with a fluid injecting syringe 44 in the manner shown in FIGS. 2 and 3. Such syringe has a body 45 presenting an elongated cylindrical bore 46 axially therewithin, such bore receiving a plunger 47 carrying a piston 48 at its forward end. The forward end of body 45 of the syringe is provided with a forwardly converging frusto-conical portion 49 on the outer end of which there is secured a forwardly projecting slightly tapered nozzle 50. Nozzle 50 is of such diameter relative to passage portion 22 in the valve body that a substantial seal is effected between the nozzle and the valve body when the nozzle is thrust into the forward end of the passage 22 as shown in FIG. 3. When the nozzle 50 has been thus inserted into the valve, the end of the nozzle abuts the outer end of stem portion 29 of the movable valve element 27 thereby thrusting the valve element into the open position thereof shown in FIG. 3. Assuming that the catheter has been applied to the patient, fluid may then be injected into the retaining "balloon" portion 16 thereof by the syringe, the fluid passing from the bore in the nozzle 50 of the syringe, escaping laterally in both directions into annular space 33 along a central V-shaped notch 51 in the outer end of stem element 29 of the valve, and then flowing inwardly through the valve. Upon retraction of the nozzle 50 of the syringe from the valve, the spring member 32 thrusts the movable valve element 27 into its forward, closed position, as shown in FIG. 2. Fluid may be exhausted from the retaining portion 16' of the catheter by inserting a suitable small blunt instrument into the notch 51 in the outer end of the valve element 27, thereby to retract the valve element and to permit fluid to flow outwardly therethrough from the catheter. If the nozzle 50 of syringe 44 is used as such blunt instrument, and if the inflating fluid is a liquid, the escaping liquid may be sucked up by the syringe. If immediate evacuation of the retaining portion 16′ is required, the valve 18 may be removed from the catheter by severing the branch tube 17 as by a knife or a pair of scissors.

The described spring element 32 is advantageous for a number of reasons. Not only is it economically made, readily installed in the valve, and readily sterilized, but such spring element has a desirable, novel interaction with the movable valve element 27. When the helical spring elements 35 of member 32 have a helical angular extent which somewhat exceeds 180°, axial compression of the spring member causes the annular portion 34 thereof to rotate in the direction of turn of the spring members 35, assuming that member 37 is restrained from rotation, as it is by reason of its frictional engagement over an annular surface of large diameter with the annular abutment 40. When the spring member 32 is permitted to expand axially after such compression, the spring members 35 thereof tend to return to the original partially compressed condition which they have in the valve closed position of FIG. 2, thereby causing the annular member 34 of the spring element to turn in the direction of unwinding of the spring members 35. Thus when the nozzle 50 of the syringe 44 is inserted into the valve as shown in FIG. 3 and the spring element 32 is axially compressed, the annular member 34 thereof turns in the direction of the arrow in FIG. 3. When the nozzle 50 of the syringe is withdrawn, the annular member 34 of the spring element turns in the reverse direction. Such function of the spring element is employed to impart a desirable turning and wiping action to the valve element 27 upon both the opening and closing of the valve.

For this purpose the annular member 34 is provided with two thin partition members 41 which intersect centrally of the annular member and extend at right angles to each other. The forward ends of partitions 41 lie substantially flush with the forward edge of the annular member 34 proper. The movable valve element 27 is made of resilient material which is soft enough to become slightly locally indented by both the forward edge of the annular member 34 and the forward edges of the partitions 41 attached thereto. The slight consequent welling up of portions of the upper surface 38 of the head 30 of the valve element is shown in exaggerated manner at 42 in FIGS. 2 and 3. Thus the annular member 34 and the partitions 41 attached thereto are frictionally coupled to the valve element 27 so that valve element tends to turn with the annular member 34 during axial compression and expansion of the spring member.

The lubricating films of water, formed between the end of the nozzle 50 and the outer end of stem 22 of the valve, and formed between the surface of notch 51 and the valve element retracting instrument, facilitate the turning of the valve element during the opening and closing of the valve. Such turning of the movable valve element 27 causes the seat 31 thereon to be turned and "wrung" into place on seat 24 as the valve is closed, thereby aiding in the sealing of the valve. As a result of such turning of the movable valve element, there is a tendency for any foreign material on the valve seats to be removed therefrom before the valve is fully closed. As above disclosed, in the embodiment shown the spring members 35 extend through an angle about their common axis of substantially 270°. It is to be understood, however, that the helical springs employed in the valve of the invention are not limited to such value but may have an angular extent from somewhat above 180° to and substantially above 270°, wherein the described relative turning of the opposite ends of the spring member relative to each other upon axial compression and expansion of the spring member is attained.

In some instances it may be preferred to make the spring element 32 with spring members 35 of the opposite hand from that in the spring element shown. With the preferred construction shown, however, upon thrusting the valve element to the rear from its closed toward its fully open position the valve element 27 will be turned so that the surface thereof facing the reader in FIG. 3 travels from left to right. Such construction is of advantage where the operator, when inserting the syringe nozzle into the valve, naturally tends to turn the syringe clockwise.

If the spring members 35 were made to extend through an angle about the axis of member 32 which is 180° or less, the member 32 tends to act only as a collapsible column, its ends remaining non-rotatable with respect to each other as the member is compressed and allowed to expand axially. When the spring members 35 extend through an angle about the axis of member 32 which is somewhat greater than 180°, however, such members act in torsion when the member 32 is axially compressed, such torsion causing the members 35 to curl further about their axes and thus the ends of member 32 to turn with respect to each other. The spring member is softer, all other conditions being the same, upon an increase in the angle through which the spring members 35 extend about the axis of member 32. The spring member can also be made softer by decreasing the cross section, thickness and/or width, of spring members 35, and can be made stiffer by increasing such cross section. As a practical limit, with the construction shown the spring members 35 should not extend much more than 360° about the axis of member 32, because beyond such value the members 35 tend to unduly close the fluid passage through the valve when the valve element 27 is thrust to its valve open position.

The herein described and shown valve can not as a practical matter be jammed to prevent fluid from passing therethrough despite the opening of the valve far beyond its normal open position. In practice, the compression range of spring element 32, and thus the range of axial movement of the valve element 27, are made greater than the length of the syringe nozzle. As a result, the operator can not jam the valve by inserting the syringe nozzle thereinto for its full length, nor can fluid (water) flow through the valve be accidentally sealed off. The making of the spring element 32 of plastic material is highly advantageous, since such springs are completely rust and corrosion resistant. Although the valve has been described in connection with the control of the passage of liquids such as water, it is to be understood that the valve may be used to advantage in controlling any fluid, including gases, such as air, and other liquids.

The spring element 32 is further of advantage in that it will not tangle with other similar springs when stored in a mass or when hopper fed. This is a great advantage in economy in the assembling of the valve.

The configurations and manner of cooperation of the valve seats 24 and 31 of the valve 18 shown in FIGS. 1–4, inclusive, are shown more clearly in FIG. 5. As there shown, seat 24 is formed as the radially inner annular edge of a narrow transverse annular shoulder 26 disposed at the junction between portions 22 and 25 of the passage through the valve body 21. The outer edge of shoulder 26 merges smoothly with a curved fillet 28, the upper edge of which merges with the lower end of portion 25 of the passage. The valve seat 31, which is generally in the form of a part of a sphere disposed coaxial of the valve element 27, has its larger end located at the rear end of such element and its smaller, forward end joined to the rear end of the stem 29 of the valve element. With such preferred valve seats 24 and 31, sealing contact with a high pressure per unit area between the seats takes place along virtually a circular line. A positive seal is secured between the seats despite any canting of the valve element 27 with respect to the axis of the valve body 19.

Figure 6:
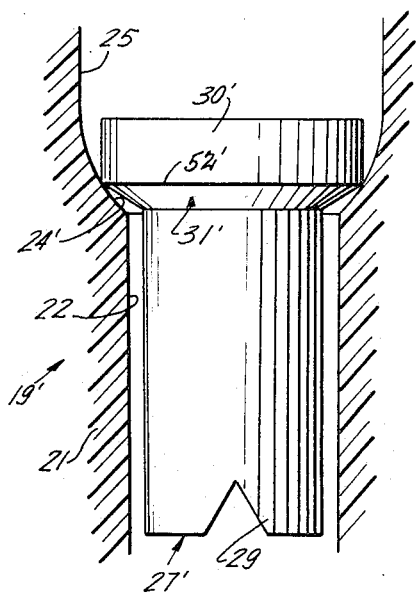
FIG. 6 is a view similar to that of FIG. 5, but showing modified configurations of the cooperating valve seats on the valve body and on the movable valve element.

In FIG. 6 the valve body 19', the seat 24' therein, and the seat 31' on the valve element 27', are of somewhat different construction from that shown in FIGS. 1–5, inclusive. Thus the seat 24' on the valve body 19' is in the form of a part of a torus which is positioned coaxial of the valve body. The rear, larger diameter of the seat 24' merges smoothly with the forward end of the passage portion 25 in such body, the forward, inner end of the seat meeting the rear end of passage portion 22 at a pronounced angle, as shown. The seat 31' on the valve element 27' is in the form of a frustum of a cone, seat 31' being specifically the same as that shown in FIG. 7, to be described, wherein the elements of the seat are disposed at an angle of 30° with relation to a transverse plane through the axis of the valve element. The seats 24' and 31' are of such relative dimensions and so disposed relative to each other that when the valve is closed, as shown in FIG. 6, the rear annular edge 52' of seat 31' engages seat 24' along virtually an annular line. Thus, as in FIG. 5, sealing with a high pressure per unit area is secured between the valve seats along substantially an annular line despite misalignment between the valve element and the valve body which is permitted by the loose guiding engagement between the passage portions 22 and 25 of the valve body and the outer surface of the stem 29 and the peripheral surface 30 of the valve element 27'.

Figure 7:
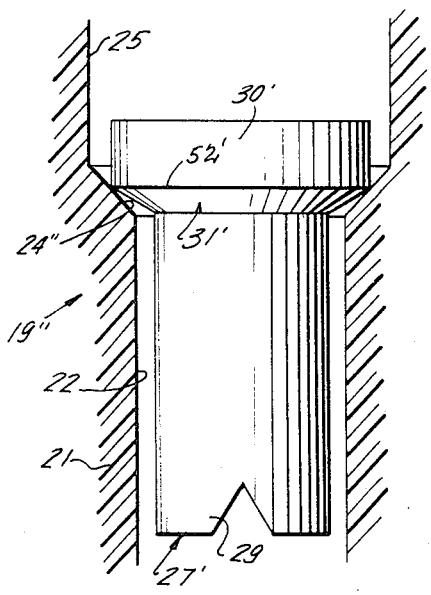
FIG. 7 is a view similar to those of FIGS. 5 and 6 showing a further modified valve seat on the valve body cooperating with a valve seat on the valve element, the latter valve seat being similar to that of FIG. 6.

In the construction of FIG. 7, the valve element and the seat thereon are the same as those in FIG. 6 and are thus designated by the same reference characters as in FIG. 6. The valve body, here designated 19'', differs from those of the previously described embodiments by having a seat 24'' which connects passage portions 22 and 25 in the form of a frustum of a cone here specifically shown as having the elements thereof making an angle of 45° with respect to a plane disposed transverse of the axis of the valve body. Thus with such construction, as with that of FIG. 6, when the valve is closed, sealing is effected between the valve body and valve element along substantially an annular line at the zone of contact between the rear larger edge 52' of seat 31' of the valve element and the seat 24'' of the valve body.

Figure 8:
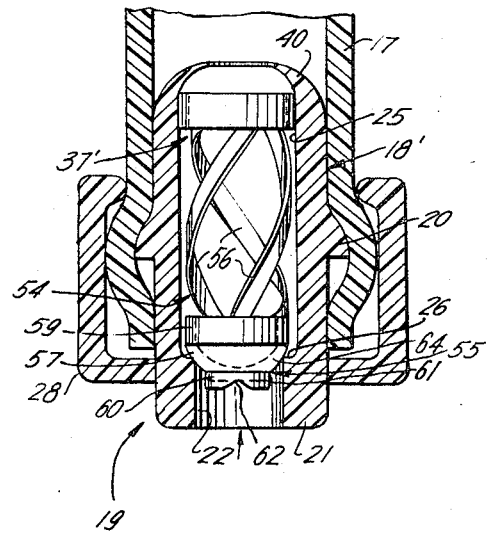
FIG. 8 is a view in axial section through a fourth embodiment of valve in accordance with the invention.

In FIG. 8 there is shown a fourth embodiment of check valve, generally designated 18', made in accordance with the invention. Such valve differs from the valve shown in FIGS. 1–5, inclusive, in the construction of the inner valve element and spring, the structure of the outer valve body and its manner of cooperation with the outer end of tube 17 being the same as in the embodiment of FIGS. 1–5, inclusive. Consequently, the same reference characters are employed to designate the tube and parts of the outer valve body of the valve 18' of FIG. 8 as those used in FIGS. 1–5, inclusive, to designate the same parts.

The valve 18' is provided with an integral inner member 54 disposed within the passage 22, 25 through the valve body, such member 54 including a portion 55 forming a lower, inner valve element, a plurality (three shown) of helical spring-forming elements 56, and an upper annular member 37' which is generally similar to member 37 of the embodiment of valve shown in FIGS. 1–5, inclusive. The member 54 may be molded of rubber-like material such as neoprene or a plastic material which is similar thereto.

The lower, inner valve element 55 is generally in the form of an upwardly (FIG. 8) open cup having a body 57 with an annular upper sidewall portion 59 to which the lower ends of the spring-forming elements 56 are integrally attached. Depending centrally from the lower end of body 57 is a short stem or projection 60 having a diameter somewhat smaller than that of portion 22 of the passage in the valve body, so that the peripheral surface 61 of the member 60 lies spaced from the surface of passage portion 22. There is thus presented an annular passage between body 55 and the passage through the valve body when the body 55 is raised from the annular seat 26 in the valve body. The stem member 60 has an inverted V-shaped groove 62 transversely thereof in its lower end similar to the groove 51 of the first disclosure embodiments of valve, so that the stem 60 may be stably engaged by the upper end of an elongated valve-opening member such as a syringe nozzle. The seat 64 on the inner valve element 55 is in the form of an annular zone of a sphere which lies coaxial of member 54, the seat 64 engaging the seat 26 in the valve body along substantially a circular line when the valve is closed.

The valve 18' is of advantage because of its simplicity of construction and the ease with which it is assembled, since it consists of but two separate parts as compared with the three separate parts of which the valves shown in FIGS. 1–7, inclusive, are composed. The three helical spring-forming elements 56, which are disposed at equal angles around the longitudinal axis of member 54, add to the stability with which member 55 is retained substantially on the axis of member 54 when member 55 is raised from the valve seat 26. The spring-forming elements 56 of valve 18', as do such elements of the first three disclosed embodiments of valve, preferably extend through a helix angle greater than 180°, and are so constructed and arranged that when they are axially compressed upon the full opening of the valve there are presented a number of fluid conducting paths therebetween which in the aggregate are at least equal in area to that presented between valve seats 26 and 64.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. A fluid control valve comprising an elongated valve body having a passage extending longitudinally therethrough, a first, annular valve seat in the passage intermediate the length thereof, a valve element reciprocable longitudinally within the passage, said valve element having a second, annular valve seat selectively cooperating with the first valve seat to overlie the first seat to close the passage through the valve body and to be retracted from the first seat to open said passage, and yieldable means constantly urging the valve element forwardly toward its valve closed position, the yieldable means including a plurality of similar helically formed leaf spring members disposed longitudinally of and spaced substantially equal about the axis of the valve element, and comprising means at each end of the yieldable means connecting the respective ends of the leaf spring members together, an abutment member on the valve body, the yieldable means being compressively engaged at one end by the valve element and at the other end by the abutment member with the leaf spring member connecting means at said one end of the yieldable means engaging and held from rotation by the abutment member, the leaf spring members being disposed with their broad extents parallel to the axis of the yieldable means, and being of such helical angle and axial width that they present fluid conducting passages of substantial area therethrough when they are axially compressed upon retraction of the valve element to its normal valve open position, upon selective axial compression and extension of the leaf spring members from and toward their valve closed positions, respectively, the leaf spring member connecting means at said one end of the yieldable means being rotated in opposite directions, the valve element being made of elastomeric material and the means on the yieldable means engaging the valve element including one of said members connecting the ends of the leaf spring members together, said one connecting member having at least one cross member thereon, the forward edge of the cross member frictionally engaging and at least slightly indenting the rear end surface of the valve element, whereby the valve element turns with said one connecting member.

2. A valve as claimed in claim 1, wherein the valve element is made of relatively soft material.

3. A valve as claimed in claim 1, wherein said leaf spring members extend through a helix angle greater than 180°.

4. A valve as claimed in claim 1, wherein said leaf spring members and the means connecting the respective ends of the leaf spring members are integrally formed of plastic material.

5. A valve as claimed in claim 1, wherein the means connecting the respective ends of the helical spring members together are annular members disposed coaxially of the yieldable means and at least substantially coaxial of the valve element, and the spring members are connected to the confronting edges of the respective annular members.

6. A valve as claimed in claim 5, wherein the spring mmbers and the annular members are integrally formed of plastic material.

7. A valve as claimed in claim 5, wherein the valve element is made of relatively soft elastomeric material and the means on the spring means engaging the valve element includes one of said annular members, said one annular member having at least one cross member therewithin, the forward edge of the said one annular member and the forward edge of the cross member frictionally engaging and at least slightly indenting the rear end surface of the valve element.

8. A fluid control valve comprising an elongated valve body having a passage extending longitudinally therethrough, a first, annular valve seat in the pasage intermediate the length thereof, a valve element reciprocable longitudinally within the passage, said valve element having a second, annular valve seat selectively cooperating with the first valve seat to overlie the first seat to close the passage through the valve body and to be retracted from the first seat to open said passage, and yieldable means constantly urging the valve element forwardly toward its valve closed position, the yieldable means including a plurality of similar helically formed leaf spring members disposed longitudinally of and spaced substantially equally about the axis of the valve element, and comprising means at each end of the yieldable means connecting the respective ends of the leaf spring members together, said last named means being annular members disposed coaxially of the yieldable means and at least substantially coaxial of the valve element, the leaf spring members being connected to the confronting edges of the respective annular members, an abutment member on the valve body, the yieldable means being compressively engaged at one end by the valve element and at the other end by the abutment member with the leaf spring member connecting means at said one end of the yieldable means engaging and held from rotation by the abutment member, the leaf spring members being disposed with their broad extents parallel to the axis of the yieldable means, being of such helical angle and axial width that they present fluid conducting passages of substantial area therethrough when they are axially compressed upon retraction of the valve element to its normal valve open position, and extending through a helix angle greater than 180°, upon selective axial compression and extension of the leaf spring members from and toward their valve closed positions, respectively, the leaf spring member connecting means at said one end of the yieldable means being rotated in opposite directions, the valve element being made of relatively soft elastomeric material and the means on the yieldable means engaging the valve element including one of said anular members, said one annular member having at least one cross member therewithin, the forward edge of the said one annular member and the forward edge of the cross member frictionally engaging and at least slightly indenting the rear end surface of the valve element, whereby the valve element turns with the said one annular member.

References Cited

UNITED STATES PATENTS

| | | | |
|---|---|---|---|
| 3,063,461 | 11/1962 | Rudolph | 137—525 X |
| 3,077,205 | 2/1963 | Butterworth | 137—525 |
| 1,055,437 | 3/1913 | Aldridge | 137—543.17 |
| 1,582,928 | 5/1926 | Hoag | 137—539 X |
| 1,886,205 | 11/1932 | Lyford | 137—543.17 |
| 2,208,690 | 7/1940 | Tydon | 137—543.17 |
| 2,270,751 | 1/1942 | Bixler | 137—543.17 X |
| 2,590,686 | 3/1952 | Coffey | 137—543.17 X |
| 2,875,779 | 3/1959 | Campbell | 137—543.17 X |
| 3,192,949 | 7/1965 | De See | 151—339 X |

ALAN COHAN, *Primary Examiner.*

D. H. LAMBERT, *Assistant Examiner.*

U.S. Cl. X.R.

137—243.2

UNITED STATES PATENT OFFICE
CERTIFICATE OF CORRECTION

Patent No. 3,429,338

February 25, 1969

Henry H. Mackal et al.

It is certified that error appears in the above identified patent and that said Letters Patent are hereby corrected as shown below:

In the heading to the printed specification, lines 5 to 7, "Henry H. Mackal, 1924 Sunrise Key Blvd., Fort Lauderdale, Fla. 33304, and Armen Bogossian, 584 Cumberland Ave., Teaneck, N. J. 07666" should read -- Henry H. Mackal, Fort Lauderdale, Fla., an Armen Bogossian, Teaneck, N. J., assignors to Halkey-Roberts Corporation, Paramus, N. J. a corporation of New Jersey --.

Signed and sealed this 24th day of March 1970.

(SEAL)
Attest:

Edward M. Fletcher, Jr.
Attesting Officer

WILLIAM E. SCHUYLER, JR.
Commissioner of Patents